United States Patent
Tione

(10) Patent No.: US 11,745,719 B2
(45) Date of Patent: Sep. 5, 2023

(54) ELECTRONIC CONTROL SYSTEM OF EMERGENCY AND SERVICE BRAKING FOR A RAILWAY VEHICLE

(71) Applicant: FAIVELEY TRANSPORT ITALIA S.p.A., Piossasco (IT)

(72) Inventor: Roberto Tione, Lauriano (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 320 days.

(21) Appl. No.: 16/604,211

(22) PCT Filed: Apr. 11, 2018

(86) PCT No.: PCT/IB2018/052533
§ 371 (c)(1),
(2) Date: Oct. 10, 2019

(87) PCT Pub. No.: WO2018/189693
PCT Pub. Date: Oct. 18, 2018

(65) Prior Publication Data
US 2020/0031330 A1    Jan. 30, 2020

(30) Foreign Application Priority Data

Apr. 12, 2017 (IT) .......................... 102017000040680

(51) Int. Cl.
*B60T 13/68* (2006.01)
*B60T 17/22* (2006.01)
*B60T 13/66* (2006.01)

(52) U.S. Cl.
CPC .......... *B60T 17/228* (2013.01); *B60T 13/662* (2013.01); *B60T 13/68* (2013.01)

(58) Field of Classification Search
CPC .... B60T 8/1705; B60T 8/3235; B60T 13/683; B60T 17/228; B60T 13/662; B60T 13/68

USPC ............................................................. 303/7
See application file for complete search history.

(56) References Cited

U.S. PATENT DOCUMENTS 3,887,239 A * 6/1975 Engle .................... B60T 8/4809
303/128
3,970,348 A * 7/1976 Maskery ............... B60T 8/1705
303/22.7

(Continued)

FOREIGN PATENT DOCUMENTS

WO    2013144543 A2    10/2013
WO    2016075642 A1    5/2016

OTHER PUBLICATIONS

International Search Report, issued in PCT/IB2018/052533, dated Sep. 18, 2018, Rijswijk, Netherlands.

*Primary Examiner* — Bradley T King
(74) *Attorney, Agent, or Firm* — THE SMALL PATENT LAW GROUP LLC; Mary D. Lawlor

(57) ABSTRACT

An electronic control system of emergency and service braking comprises an emergency brake module and a service brake module, each module including an independent and segregated electronic architecture. The service brake module receives a deceleration/service braking demand signal and generates a service braking pressure signal. The emergency brake module connected to the service brake module to receive the service braking pressure signal, receives a signal indicative of an emergency braking demand, generates a respective intermediate braking pressure signal indicating an emergency braking, generates a signal corresponding to the higher value between the service braking pressure signal and the intermediate braking pressure signal indicative of an emergency braking, which is converted to braking pressure.

17 Claims, 9 Drawing Sheets

(56) References Cited

U.S. PATENT DOCUMENTS

| | | | | |
|---|---|---|---|---|
| 4,145,091 | A * | 3/1979 | Bueler | B60T 17/18 303/118.1 |
| 4,915,458 | A * | 4/1990 | Deike | B60T 8/342 137/627.5 |
| 5,735,579 | A * | 4/1998 | Wood | B60T 8/3235 303/7 |
| 5,738,417 | A | 4/1998 | Wood et al. | |
| 8,297,714 | B2 * | 10/2012 | Bensch | B60T 8/362 303/7 |
| 2001/0033105 | A1 * | 10/2001 | Frank | B60T 8/5012 303/20 |
| 2013/0338860 | A1 * | 12/2013 | Herden | B61H 9/00 701/20 |
| 2014/0217810 | A1 * | 8/2014 | Herden | B60T 8/1705 303/132 |
| 2014/0319904 | A1 * | 10/2014 | Watanabe | B60T 13/665 303/119.1 |
| 2014/0345491 | A1 * | 11/2014 | Scharpf | B61H 13/20 105/1.4 |
| 2015/0061359 | A1 * | 3/2015 | Grasso | B60T 15/027 303/8 |
| 2015/0134157 | A1 * | 5/2015 | Aurich | B60T 17/228 701/20 |
| 2017/0096128 | A1 * | 4/2017 | Correndo | B61H 11/14 |
| 2018/0118228 | A1 * | 5/2018 | Worden | B60T 7/12 |
| 2018/0354479 | A1 * | 12/2018 | Mauder | B60T 13/665 |
| 2020/0130659 | A1 * | 4/2020 | Grasso | B60T 13/665 |
| 2021/0039615 | A1 * | 2/2021 | Tione | B60T 8/172 |
| 2021/0309191 | A1 * | 10/2021 | Lv | B60T 13/683 |

* cited by examiner

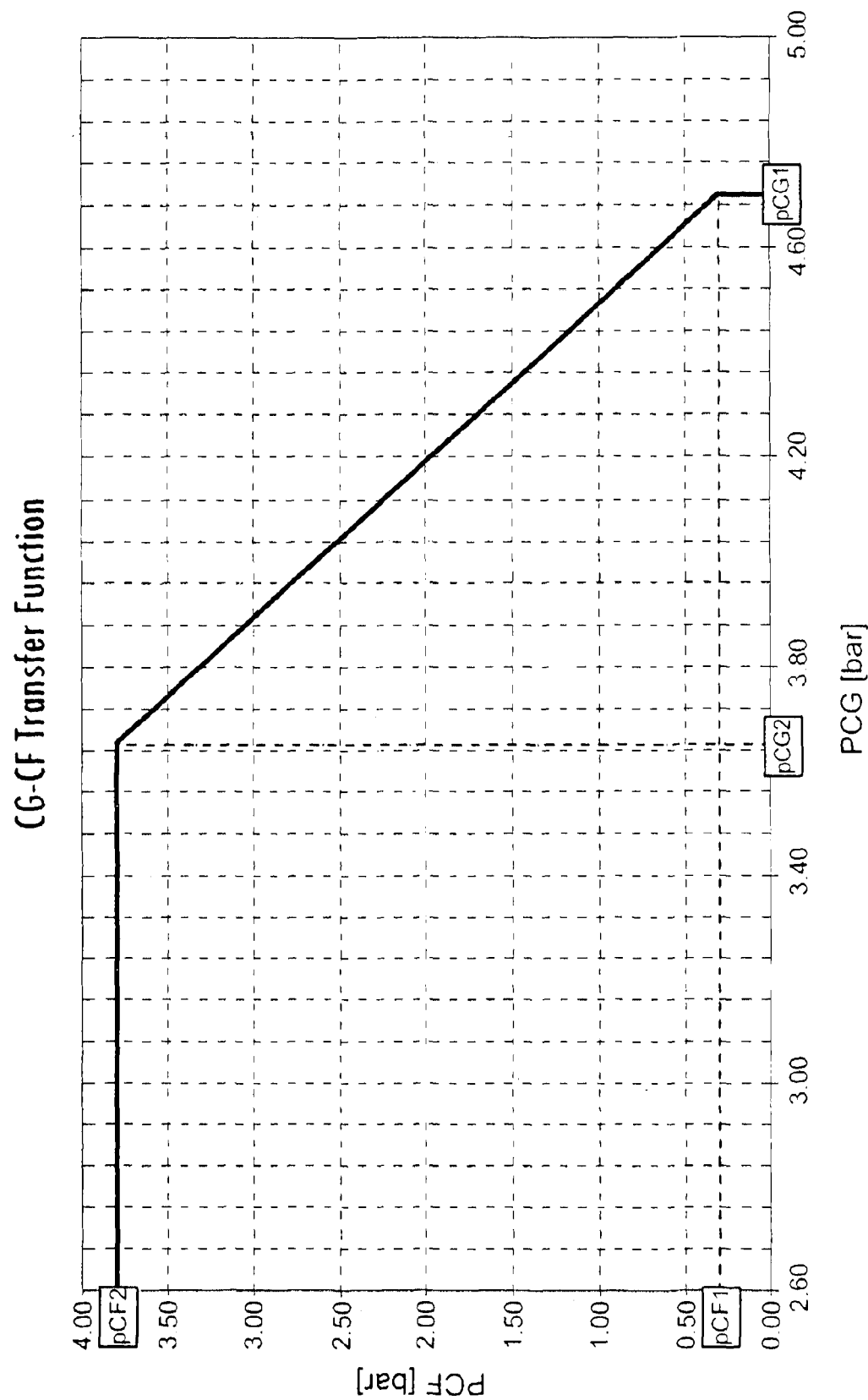
FIG.2.1

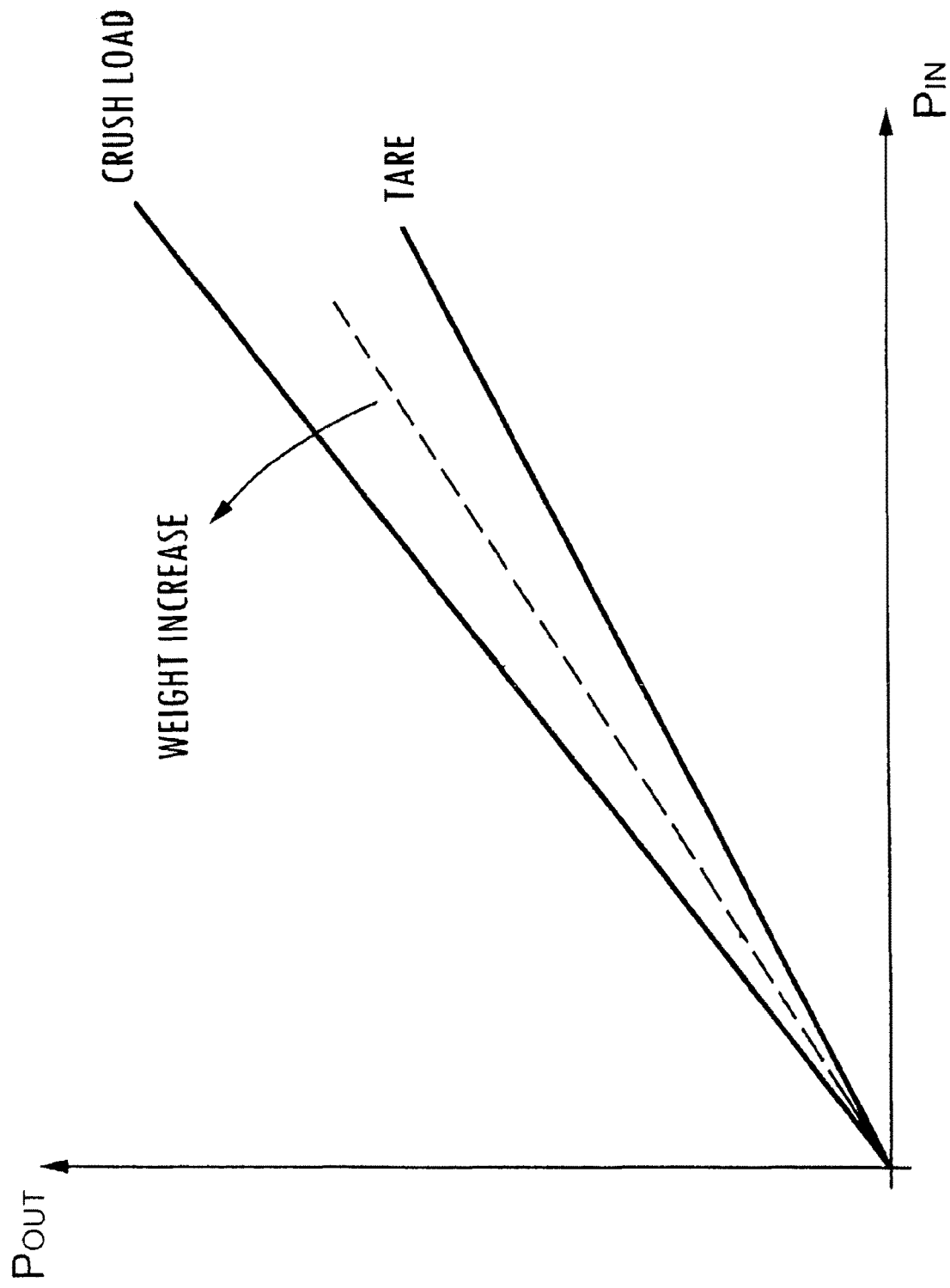
FIG.2.2

ELECTRONIC CONTROL SYSTEM OF EMERGENCY AND SERVICE BRAKING FOR A RAILWAY VEHICLE

CROSS-REFERENCE TO RELATED APPLICATIONS

This application is a National Phase Application of PCT International Application No. PCT/IB/2018/052533, having an International Filing Date of Apr. 11, 2018 which claims priority to Italian Application No. 102017000040680 filed Apr. 12, 2017, each of which is hereby incorporated by reference in its entirety.

FIELD OF THE INVENTION

The present invention is, in general, in the field of railway braking systems; in particular, the invention refers to a system for controlling the emergency and service braking of a railway vehicle.

BACKGROUND OF THE INVENTION

Conventional rail braking systems perform different functions characterized by the state of the railway vehicle. The two main functions are known as "service braking" and "emergency braking".

Service braking is the state in which the rail vehicle is decelerated during normal phases of operational service. In this state, the braking performance must be guaranteed with a probability of failure of less than $10^{-7}$. This value corresponds to the Safety Integrity Level SIL2 referred to EN50126.

Emergency braking is the state in which the train must provide braking within a stopping distance predetermined by international standards, with a probability of not achieving performance typically equal to or less than $10^{-9}$. Such value corresponds to the Safety Integrity Level SIL4 of the standard EN50126.

With regard to the implementation of service braking, the braking systems relating to railway vehicles are now entirely managed by electronic controls interacting with the control systems of traction motors used in regenerative mode during braking (electrodynamic brake), and with TCMS systems, "Train Control and Monitoring Systems", for a continuous exchange of diagnostic information and real-time management of ways to compensate for possible malfunctions of the service brake system or the electrodynamic brake.

Such implementation by means of electronic systems has increased passenger comfort considerably, for example, by guaranteeing tolerable acceleration variations or by dynamically compensating the variation of the friction coefficients of the friction materials as the speed changes while keeping the deceleration uniform.

On the other hand, such electronic service braking control systems have become increasingly complex, based on microprocessor architectures executing significant quantities of software code linked not only to real-time processes for brake management, but also to the management of diagnostic processes of the complete braking system and the management of complex communication protocols such as Ethernet or MVB. For this reason, the main operators in the sector prefer to use purely pneumatic solutions during the emergency braking phase.

This is demonstrated by the publication of the railway standard EN16185. This standard standardizes the braking systems which provide two concurrent pneumatic demand channels for emergency braking.

The reason for this choice by the operators is linked to the intrinsic high safety and reliability coefficient demonstrated over time by the pneumatic architectures and the pneumatic components used, contrary to the lower reliability of electronic systems. The lower reliability is mainly linked to the potential presence of common-mode software faults that may occur simultaneously on the entire train during an emergency braking, partially or totally compromising the achievement of the stopping distances.

However, this technological choice is starting to come into conflict with the ever-increasing demands for accuracy in stopping distances during emergency braking.

Pneumatic systems and components are subject to inaccuracies due to the temperature dependency of the springs and rubber sub-components and their aging.

The further European standard EN15611 imposes strict limits on the tolerances of the aforesaid pneumatic systems and components, making them difficult to produce and extremely expensive.

An example of a pneumatic braking system integrating service braking and emergency braking known to those skilled in the art is shown in FIG. 1.

The general pipe pressure 101 is modulated by the brake valve 102 in a variable pressure range between 5 bar and 3.5 bar, wherein 5 bar is the value representing a null braking demand and 3.5 bar the value representing maximum service braking.

An emergency button 103 discharges the general pipe at values below 3.5 bar representing the emergency braking demand. A distributor valve 104 modulates the pressure at its outlet as a function of the general pipe pressure 101, according to the graph shown in FIG. 2.1.

For a general pipe pressure value of 5 bar, the outlet pressure at the distributor valve 104 is null and corresponds to a null braking demand.

For general pipe pressure values between 5 bar and 3.5 bar, the outlet pressure at the distributor valve varies linearly between 0 bar and 3.8 bar; 3.8 bar being the pressure value corresponding to emergency braking.

For general pipe pressures lower than 3.5 bar, the outlet pressure at the distributor valve remains at 3.8 bar, i.e. at the pressure value corresponding to emergency braking.

The purpose of the emergency button 103 is to discharge the general pipe bringing the pressure under the value of 3.5 bar much faster than the brake valve, accelerating the transition from the service braking state to the emergency braking state.

The empty-loaded valve 105, also known to experts as VCAV, from the French definition "Vide-Chargé Auto-Variable", has the purpose of correcting the pressure sent to the brake cylinder 106 as a function of the weight on the vehicle, according to the characteristic shown in FIG. 2.2.

The purpose of the latter function is to limit the pressure according to the available adhesion considered during the design phase of the vehicle, in other words, to provide the maximum possible braking pressure beyond which the available adhesion force would be exceeded. Exceeding the available adhesion force would lock the axles, with consequent wheel flats and loss of braking force due to the transition from rolling friction to sliding friction of the wheels themselves.

The distributor valve 104 and the empty-loaded valve 105, respectively shown schematically in FIG. 3 and FIG. 4, are extremely complex pneumatic components.

In particular, with each new application, the empty-loaded valve 105 requires the redesign of the internal bodies, such as, for example, the load of the springs or the lever ratio, which must be readjusted to the new weight ranges between tare and full vehicle load and the adhesion available for the same application.

Furthermore, it is usual to have different configurations of sub-components of the empty-loaded valves 105 for the same train, as the tare-full load interval varies between the various cars constituting the train itself, for example, between motor cars (Motor Cars) and trailer cars (Trailer Cars).

Finally, during the commissioning phase of the train, continuous recalibrations are required which involve frequent replacement of the sub-components themselves, until a correct configuration is reached.

The implementation of electronic systems for railway applications is currently regulated by the following European railway standards:

EN50126 "Railway applications. The specification and demonstration of reliability, availability, maintainability and emergency (RAMS). Basic requirements and generic process";

EN50128 "Railway applications—Communications, signalling and processing systems—Software for railway control and protection systems";

EN50129 "Railway applications. Communication, signalling and processing systems. Safety related electronic systems for signalling".

In particular, the standard EN50126 defines the methodology for allocating SIL0/1/2/3/4 safety levels to the sub-systems based on the results of Safety Analysis, and the standards EN50128 and EN50129 define the design criteria to be applied to the software and hardware components respectively according to the SIL levels allocated.

Based on the application of the aforementioned standards, the following statements and concepts may be expressed:

Electronic systems used to implement the service braking function may generally be made in accordance with the provisions of the aforesaid standards, limiting said implementation to safety levels not higher than SIL2;

Electronic systems used for achieving the emergency braking function may be achieved according to the provisions of the aforesaid standards, restricting said achievement to safety levels not less than SIL3.

It is the state of the art to implement electronic systems conforming to the SIL≤2 levels for controlling service braking; however, it is very complex and onerous to develop and maintain electronic systems that comply with SIL≥3 levels.

The relationship of complexity and cost of development and certification between SIL≤2 systems and SIL≥3 systems typically varies between 1:20 and 1:40.

Moreover, the Notified Body for Safety Certifications (Notified Body) and National Safety Agency (Safety Agency) do not accept the coexistence of software modules developed at different SIL levels executed by the same hardware architecture, nor SIL≥3-level software modules executed by SIL≤2 hardware architectures for electronic architectures that must reach an overall SIL≥3 level.

It is therefore evident that developing single electronic architectures that may simultaneously provide the service braking function, the emergency braking function, the diagnostic functions, and other functions is unprofitable, since said architectures would have to be fully achieved according to SIL≥3 levels with a high expenditure of economic resources and long development time.

SUMMARY OF THE INVENTION

An object of the present invention is therefore to provide an electronic control system of emergency and service braking of a railway vehicle which allows the emergency braking function to be segregated and made independent from the service braking function and other accessory functions, ensuring total isolation of SIL≥3-level-compliant parts from SIL≤2-level-compliant parts, while making the braking pressures converge on a single common actuator, thus reducing the cost of developing, installing and maintaining a fully electronic railway braking control system.

The aforesaid objects and other advantages are achieved, according to an aspect of the present invention, by an electronic control system of emergency braking of a railway vehicle having the features described and claimed herein. Preferential embodiments of the invention are also described.

BRIEF DESCRIPTION OF THE FIGURES

The functional and structural characteristics of some preferred embodiments of an electronic control system of emergency and service braking according to the invention will now be described. Reference is made to the accompanying drawings, wherein:

FIG. 2.1 illustrates the input-output transfer function of a distributor valve;

FIG. 2.2 illustrates a curve that functionally emulates an empty-loaded valve 105, wherein the term "crush load" indicates an unusual passenger overload condition;

DETAILED DESCRIPTION

Figure 1:
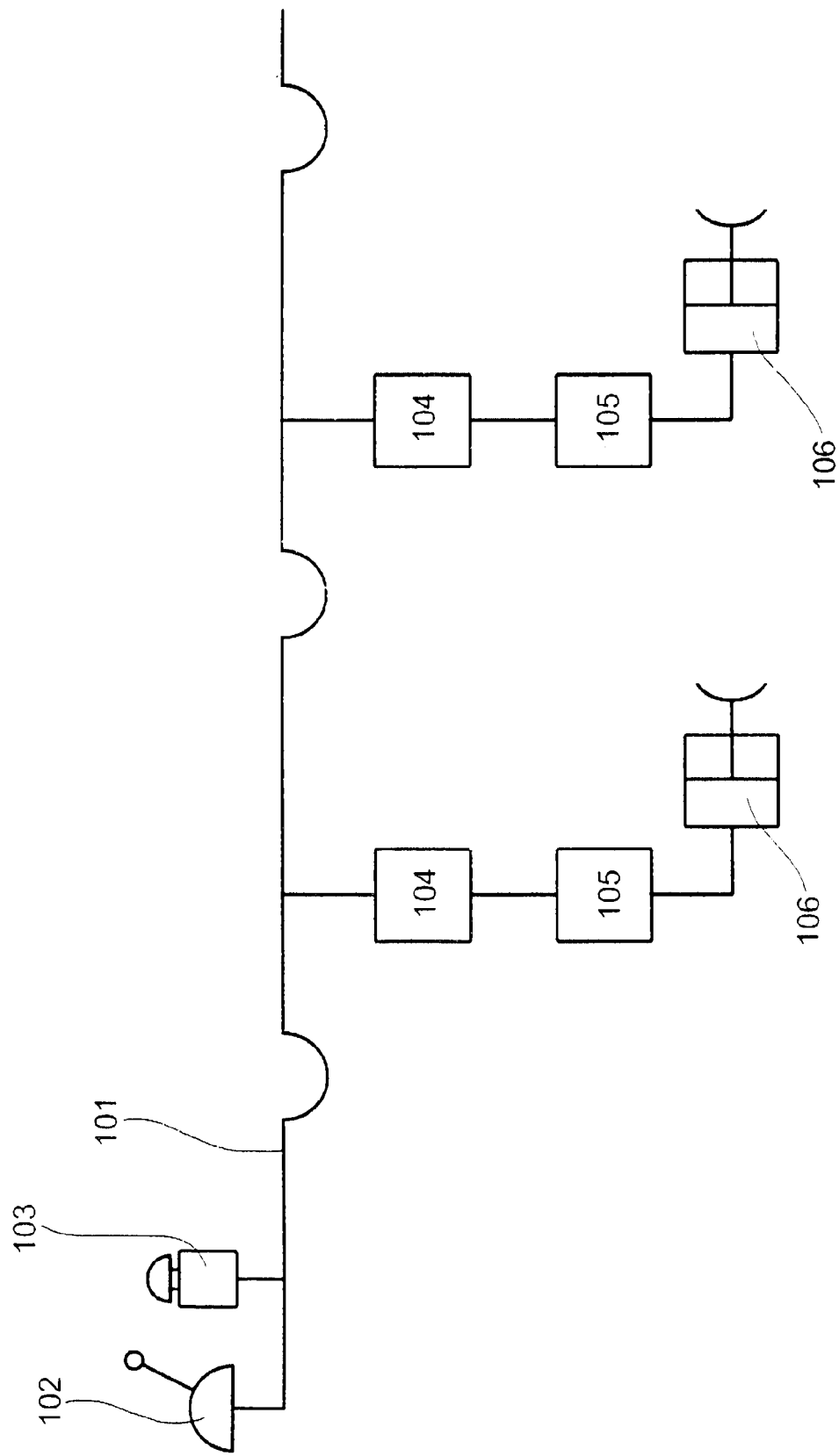
FIG. 1 illustrates, in a simplified way, a pneumatic braking system integrating for service and emergency braking, known to those skilled in the art; in the aim of simplification, the main and auxiliary reservoirs are not reported, nor are all the accessory functions not necessary for exemplification.
Figure 3:
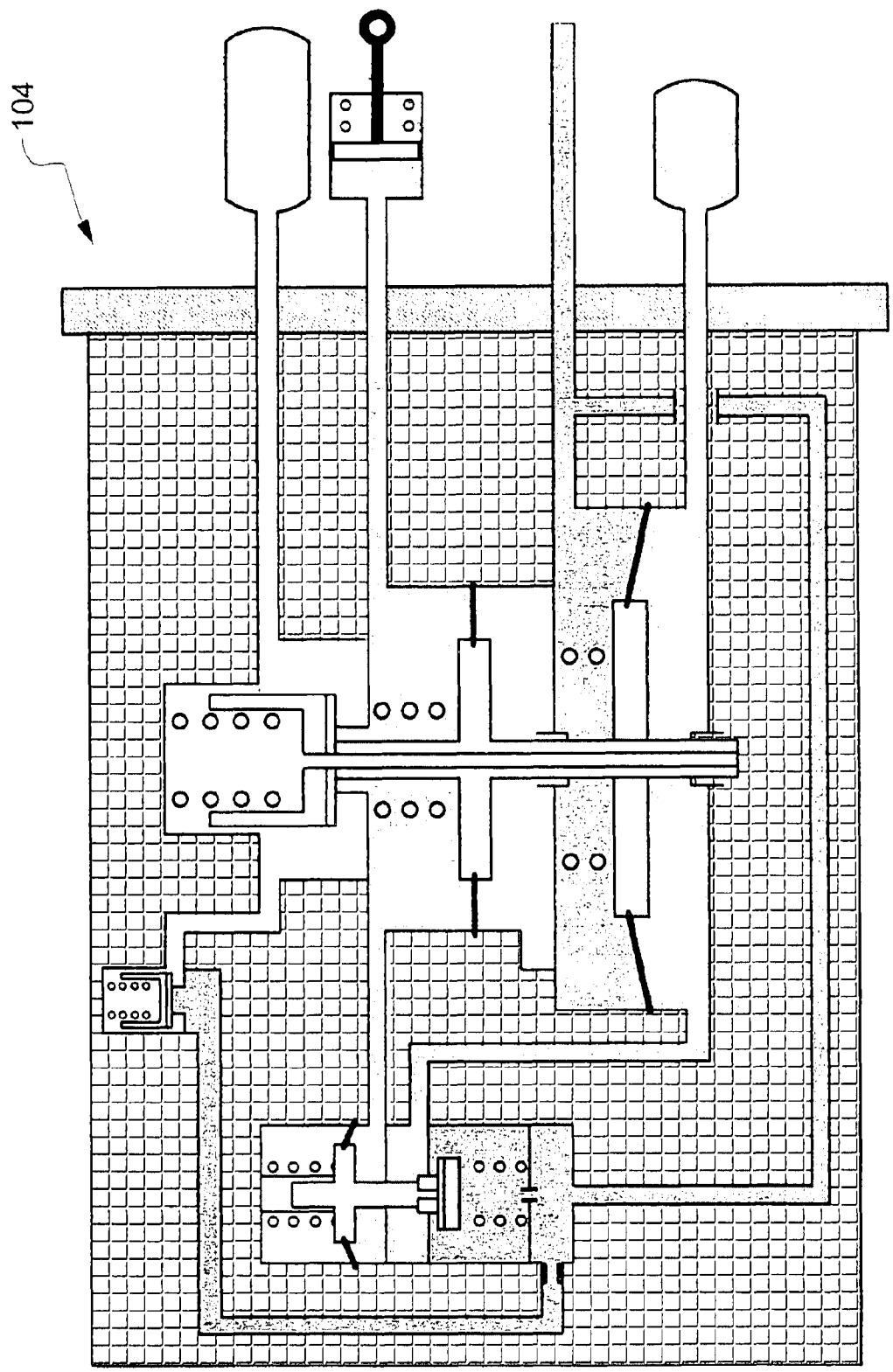
FIG. 3 illustrates a schematic view of a distributor valve.
Figure 4:
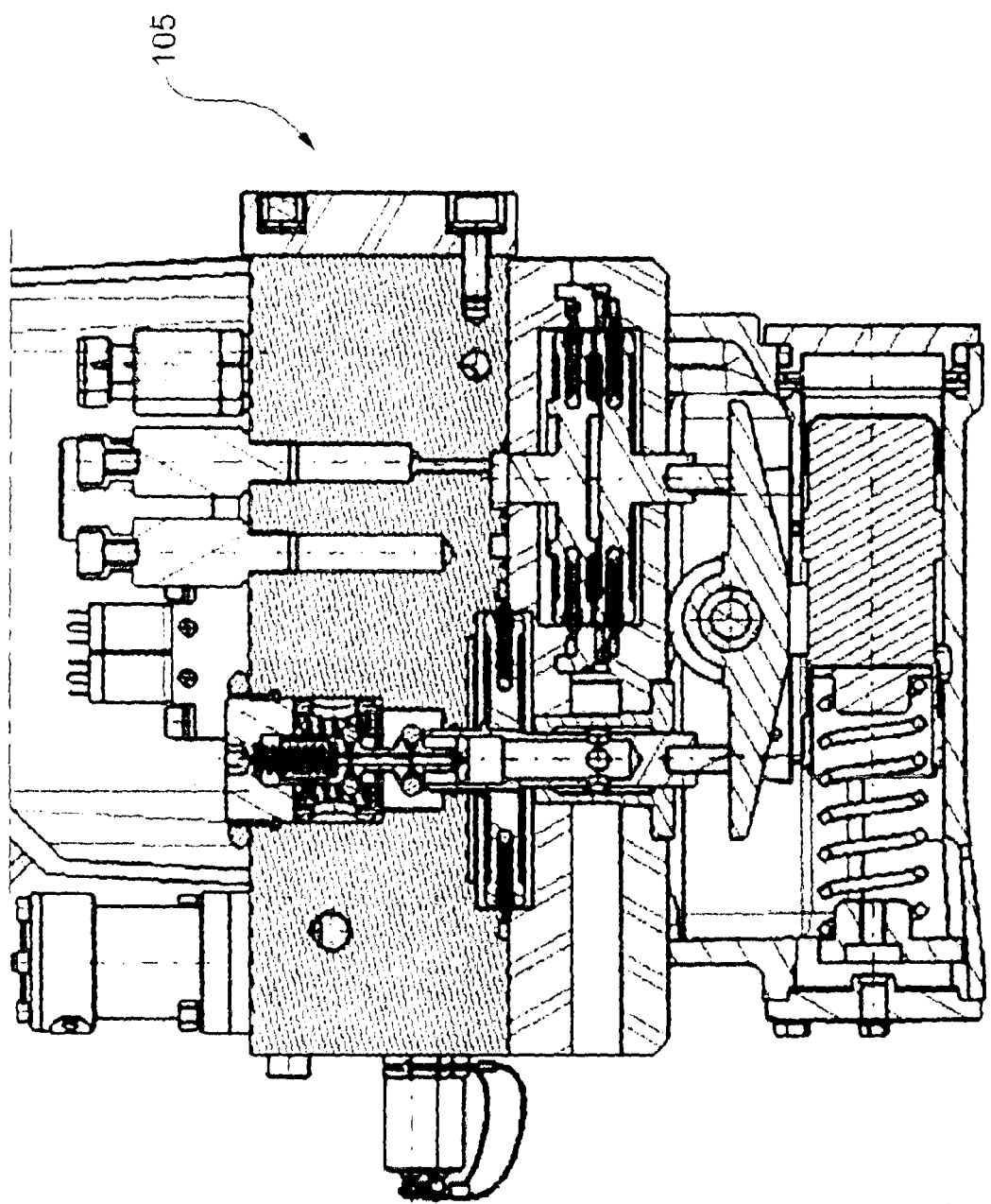
FIG. 4 illustrates the cross section of an empty-loaded valve.

Before explaining in detail a plurality of embodiments of the invention, it should be clarified that the invention is not limited in its application to the details of construction and to the configuration of the components provided in the following description or illustrated in the drawings. The invention may assume other embodiments and may be implemented or achieved in essentially different ways. It should also be understood that the phraseology and terminology have descriptive purposes and should not be construed as limiting. The use of "include" and "comprise" and their variations are to be understood as encompassing the elements stated hereinafter and their equivalents, as well as additional elements and the equivalents thereof.

Throughout the present description, the term "module" is preferably intended to mean a module that may be realized by means of an electronic hardware-software architecture, the term "submodule" preferably indicates a submodule within which functions may be achieved in turn through software or through hardware controlled by said software. The software may be executed for example by microprocessors or FPGAs.

In the figures, the lines connecting the various submodules within a module must preferably be understood as electrical signals or software variables.

The electronic control system of emergency and service braking 500 for a vehicle, particularly for a railway vehicle, according to the invention, is characterized in that it includes an emergency brake module 501 (SAFETY BRAKE MODULE) and a service brake module 507 (SERVICE BRAKE MODULE), each including an electronic architecture arranged to generate a braking pressure value, said electronic architectures being independent and segregated from each other.

The service brake module 507 is arranged to receive at least one deceleration/service braking demand signal 530 and to generate a respective service braking pressure signal 535. The emergency brake module 501 is connected to said service brake module 507 through a communication channel 536 for receiving said service braking pressure signal 535.

Said emergency brake module 501 is arranged to receive at least one signal indicating an emergency braking demand, and to generate a respective intermediate braking pressure signal indicative of an emergency braking 523.

The emergency brake module 501 is moreover provided to generate a braking pressure control signal 524 corresponding to the higher value between the service braking pressure signal 535 and the intermediate braking pressure signal indicative of an emergency braking 523, and to convert said braking pressure control signal 524 into a braking pressure by controlling an electro-pneumatic actuator 506.

Figure 5:
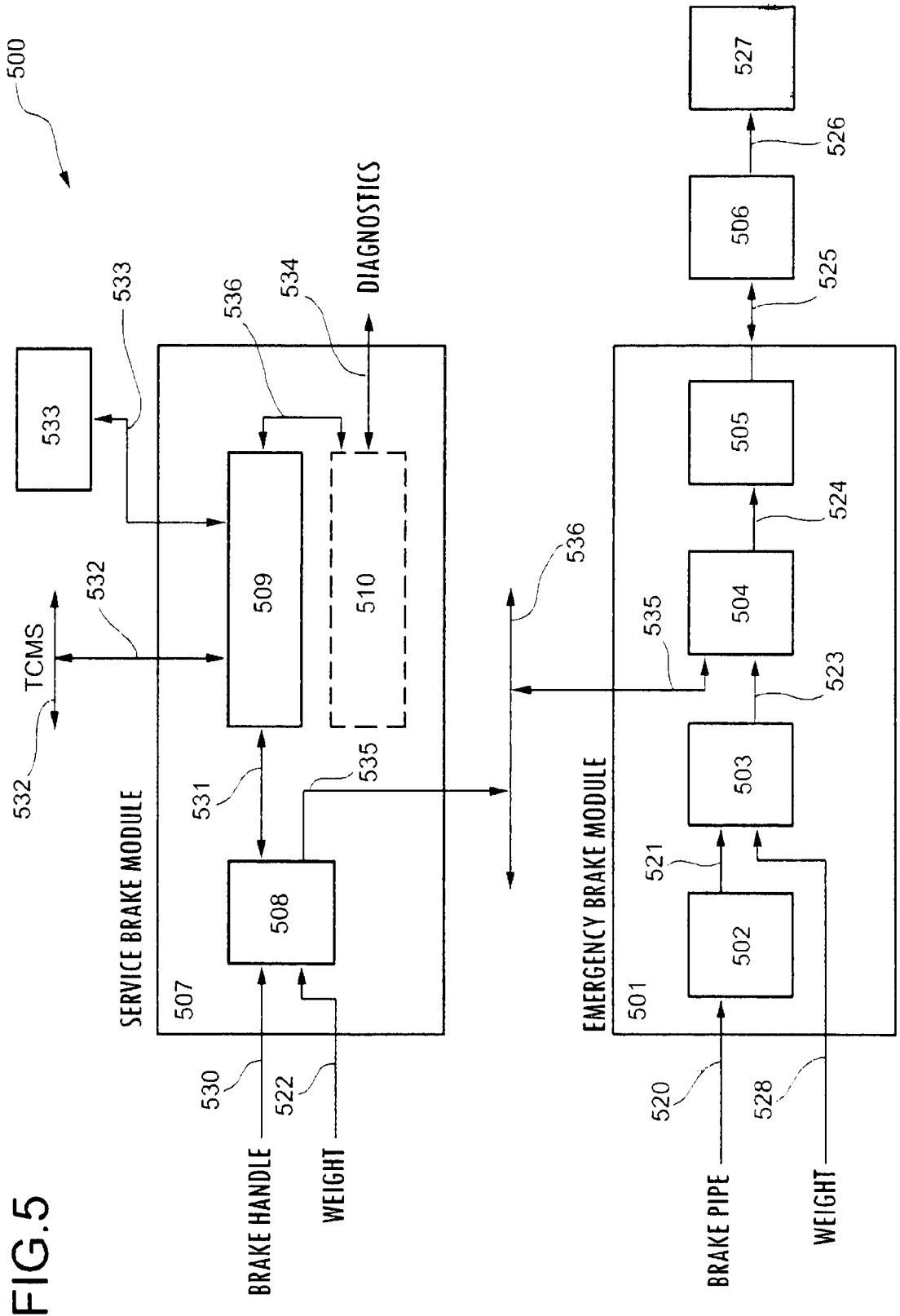
FIG. 5 illustrates a first embodiment of an electronic control system of emergency and service braking.

In a first embodiment illustrated in FIG. 5, the service brake module 507 includes a submodule for calculating a service braking pressure 508 which receives a service braking or deceleration demand 530 generated, for example, by a brake handle (BRAKE HANDLE DEMAND) via a service braking/deceleration demand 530, and the vehicle weight (WEIGHT) via a first weight signal 522.

Said first weight signal 522 is, for example, but not exclusively, the acquired pressure value coming from the suspensions or an electric voltage derived from a position sensor of the carriage relative to the bogie.

The calculation submodule of a service braking pressure 508 executes in real time the calculation of a pressure value necessary for service braking corresponding to the aforesaid service braking/deceleration demand 530 and generates a respective service braking pressure signal 535 having a value corresponding to the pressure value necessary for the calculated service braking.

The pressure value necessary for service braking is obtained by combining, for example, but not exclusively, said first service braking/deceleration demand signal 530 and said first weight signal 522, by means of a suitable function known to persons skilled in the art, similar to the one shown in FIG. 2.2.

A second service braking/deceleration demand signal 531, coming from a TCMS 532, may also be transmitted to the submodule for calculating a service braking pressure 508 by a communication submodule 509.

The communication submodule 509 provides for the management of all communication protocols to the train, for example, but not exclusively, to the TCMS 532 and to a traction system 533.

Other submodules included in the dashed box 510 may be present. For example, but not exclusively, submodules for input/output management, management and storage of diagnostic information 534 and display management, submodules for communication to diagnostic tools, and other submodules not related to emergency braking normally known to persons skilled in the art.

A communication channel 536 indifferently of the "wired" or "wireless" type, is used by the service brake module 507 and by the emergency brake module 501 for reciprocally exchanging information.

The communication channel 536 may be either "point-to-point" or shared with further modules, not necessarily dedicated to vehicle braking functions. Said further modules are not shown in FIG. 5.

The communication channel 536 may for example be constituted by a bus.

The information, and in particular the service braking pressure signal 535, is transferred from the service brake module 507 to the emergency brake module 501, for example, but not exclusively, according to the "black channel" concept as expressed in the European standard "EN50159: Railway applications. Communication, signalling and processing systems. Safety-related communication in transmission systems". The communication channel 536 may also be implemented by means of hardwired analog lines, for example, but not exclusively, in voltage or in current or PWM, or by digital encoding over several wires.

In the emergency brake module 501, a calculation submodule of a first transfer function 502 receives at least one signal indicative of an emergency braking demand.

In this embodiment, the at least one signal indicative of an emergency braking demand is a pneumatic braking signal 520 indicative of the control pressure of a vehicle braking system, for example, a suitably acquired pressure signal, corresponding to the pressure value of the brake pipe (already indicated at 101 in FIG. 1), of which the range comprises at least one value corresponding to an emergency braking.

For example, the value corresponding to an emergency braking may be a value that exceeds a predetermined threshold. The term "exceeds" may indicate both the case wherein the value is higher than the predetermined threshold or the case wherein the value is lower than the predetermined threshold.

The calculation submodule of a first transfer function 502 calculates the transfer function of the curve shown in FIG. 2.1 by functionally emulating a distributor valve 104, including the sub-functions known to those skilled in the art as a control reservoir and related behaviors with respect to the actions of overload and discharge.

The calculation submodule of a first transfer function 502 therefore outputs a distributor valve pressure signal 521, the virtual value of which may correspond to a pressure value between 0 bar and 3.8 bar according to the emulation of the distributor valve 104.

Said distributor brake pressure signal 521 is fed to a submodule for calculating a second transfer function 503, together with a second vehicle weight signal 528 ("WEIGHT") corresponding to the value of the vehicle weight acquired.

The brake line pressure signal and the second vehicle weight signal 528 are acquired according to SIL≥3 processes, for example, but not exclusively, through redundant and mutually diagnosed channels and sensors.

In an alternative embodiment, the second weight signal of the vehicle 528 may be transmitted through the communication channel 536 to the braking/deceleration demand submodule 508 which will use said second weight signal of the vehicle 528 instead of acquiring the first weight signal 522.

The calculation submodule of a second transfer function 503 calculates the transfer function of the curve shown in FIG. 2.2 by executing the emulation of the empty-loaded valve 105.

The output of the calculation submodule of a second transfer function 503 is an intermediate brake pressure signal indicative of an emergency braking 523 which represents the virtual value of the pneumatic braking pressure which should be sent to the brake cylinder, as a result of braking executed by modulating the pressure signals of the brake pipe. The range of values that the pressure signal of the brake pipe may assume includes a value corresponding to the emergency braking value. Said value is preferably represented by the maximum value achievable by pneumatic braking, i.e. by the intermediate braking pressure signal indicative of an emergency braking 523.

The two-input higher-pressure selection submodule 504 receives in input the intermediate brake pressure signal indicative of an emergency braking 523 produced by the calculation submodule of a second transfer function 503 and the service pressure signal 535 corresponding to the service braking pressure value produced by the calculation submodule of a service braking pressure 508 within the service brake module 507.

The two-input higher-pressure selection submodule 504 executes a majority selection function, propagating in output the signal having the higher virtual pressure value between the service pressure signal 535 and the intermediate braking pressure signal indicative of emergency braking 523, which may assume a value corresponding to an emergency braking. Said value corresponding to emergency braking is preferably represented by the maximum value achievable by pneumatic braking.

The braking pressure control signal 524, i.e. the higher value between the service pressure signal 535 and the intermediate braking pressure signal indicative of an emergency braking 523, is then propagated to a pressure control submodule 505 which provides for managing an electro-pneumatic actuator 506 through appropriate bidirectional electric signals 525, transforming the braking pressure control signal 524 input to the module 505 into real pressure input to the brake cylinder 527.

A non-exclusive example of the couple formed by the pressure control submodule 505 and the electro-pneumatic actuator 506 is described in the patent WO201675642.

A person skilled in the art is aware of the additional elements typical of a railway braking system, related to the electro-pneumatic actuator 506, such as auxiliary reservoirs or anti-skid control systems, not shown in FIG. 5 since they are not strictly related to the content of the present invention.

The proposed solution highlights the functional and decisional independence of the emergency brake module 501 from the service brake module 507.

If the emergency brake module 501 is developed according to SIL≥3 criteria, the probability that a pneumatic braking demand, including at least one signal indicative of an emergency braking demand corresponding to the maximum value of pneumatic braking, is not applied to the brake cylinder 527 falls within the normally accepted standards for an equivalent traditional pneumatic system, at lower cost and with higher accuracy.

Moreover, whatever type of hardware or software failure that may occur in the service brake module 507, the two-input higher-pressure selection submodule 504 of the emergency brake module 501 will in any case favor the higher braking demand present at the input thereof, i.e. always bringing the global system into a safe condition.

This solution therefore allows the service brake module 507 to be developed according to SIL≤2 safety levels, as is the case in the state of the art, without thereby increasing the development costs and recurring product costs, while maintaining the functional performance thereof.

Figure 6:
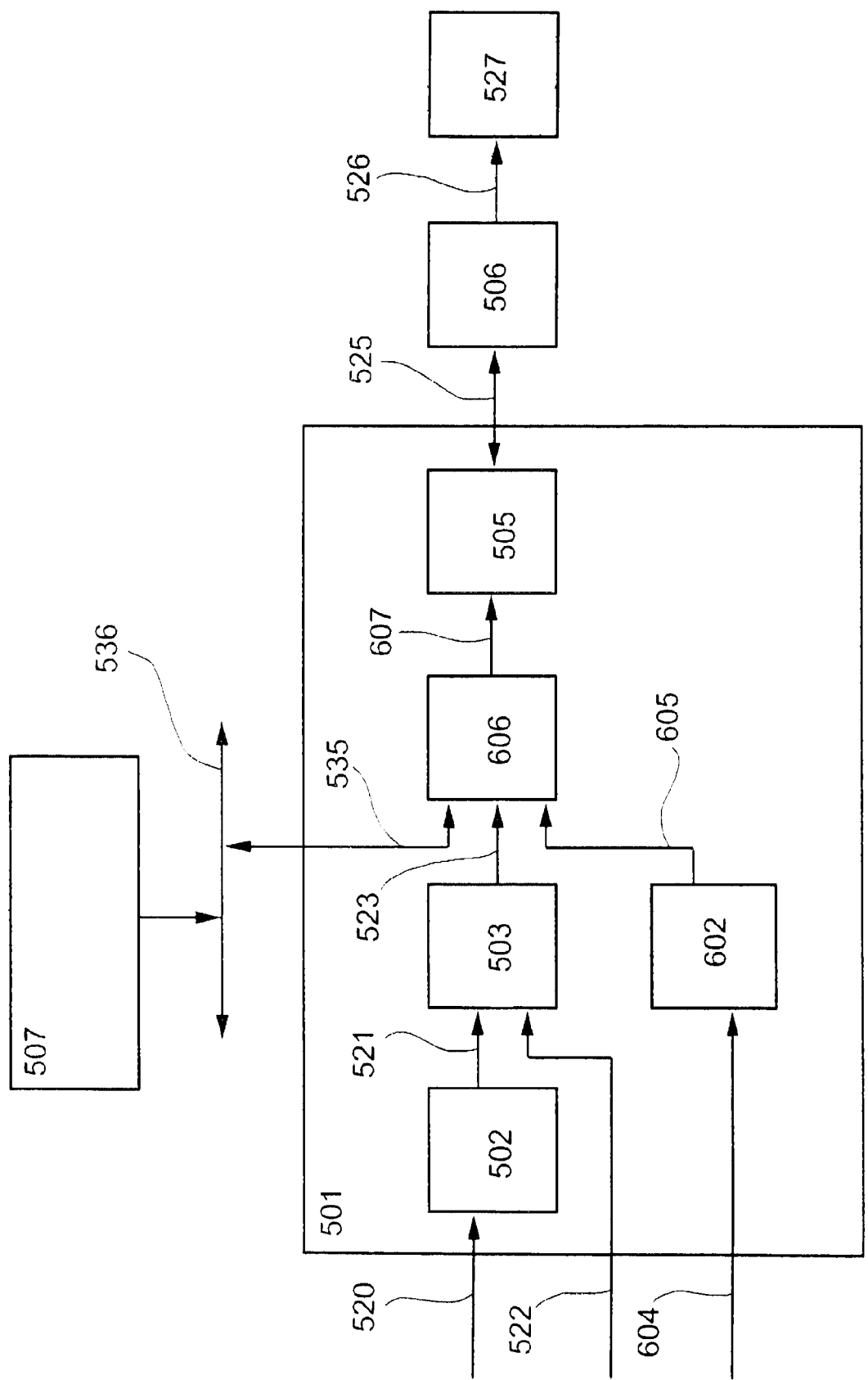
FIG. 6 illustrates a second embodiment of the emergency brake module.

FIG. 6 illustrates a second embodiment of the emergency brake module 501. The emergency brake module 501, developed in its entirety according to SIL≥3 criteria, replicates at least part of what has been described in the previous embodiment but also includes a preset emergency brake pressure allocation submodule 602. The preset emergency brake pressure allocation submodule 602 receives in input a second signal indicative of an emergency braking demand. In this embodiment, the second signal indicative of an emergency braking demand is a signal 604 indicative of an emergency braking demand coming, for example, but not exclusively, from an electric emergency loop.

"Electric emergency loop", for example, indicates an electric circuit which is able to detect an emergency braking need condition and consequently generate a signal 604 indicating an emergency braking demand.

In the event of an emergency demand declared by the signal 604 indicating an emergency braking demand coming from the electric emergency loop, the preset emergency braking pressure allocation submodule 602 imposes a virtual preset pressure value to a respective emergency braking pressure signal 605.

Instead of the two-input majority selection sub-module 504, a three-input majority selection sub-module 606 is provided that performs a majority selection function by propagating in output the signal with the highest value among the service braking request signal 535, the emergency braking pressure signal 605 from the emergency electrical loop and the intermediate braking pressure signal indicative of an emergency braking 523.

The maximum value of the intermediate braking pressure signal indicative of an emergency braking 523 corresponding to an emergency braking.

The control signal of a braking pressure 607 coming from the three-input higher-pressure selection submodule 606, i.e. the highest value among the three virtual pressure signals 535, 523 and 605, is then propagated in output to a pressure control submodule 505 which provides for managing an electro-pneumatic actuator 506 through appropriate bidirectional electric signals 525, transforming the virtual braking pressure control signal 607 input to the module 505 into a real pressure input to the brake cylinder 527.

Various combinations may be created by means of the submodules of the emergency brake module 501, for example modulating the value of the emergency braking pressure signal 605 with the value of the vehicle weight signal 528 by means of a second submodule for calculating a second transfer function 503 before sending said value of the emergency braking pressure signal 605 to the three-input majority selection submodule 606.

In one embodiment not shown, the at least one signal indicative of an emergency braking demand may be only one and only the signal 604 indicative of an emergency braking demand coming, for example, but not exclusively, from an electric emergency loop.

In a further non-exclusive embodiment, the emergency brake module 501 may not use the brake pipe pressure signal but only the emergency brake pressure signal 605, modulated or not by the weight signal 528.

Figure 7:
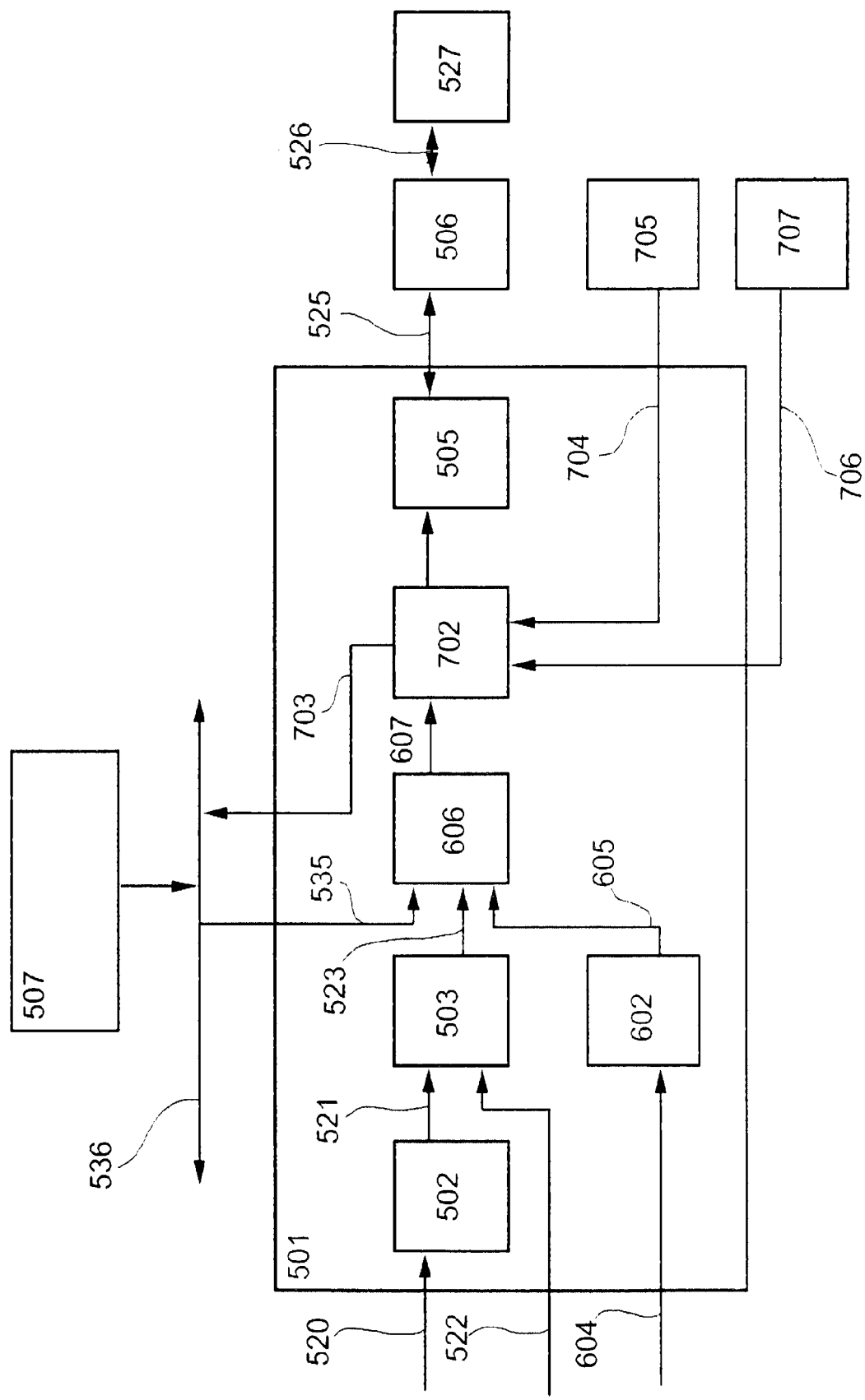
FIG. 7 illustrates a third embodiment of the emergency brake module.

An extension of what is described in FIG. 5 and in FIG. 6 is shown in FIG. 7, wherein an electrodynamic regenerative brake is used during emergency braking.

Traction control is currently composed of inverters based on DSP (Digital Signal Processor) architectures that are not suitable for development according to SIL≥3 criteria.

It is therefore impossible to entrust the emergency braking demand to the traction systems directly unless traction control is continuously monitored with an SIL≥3 system during emergency braking.

FIG. 7 illustrates a third embodiment of the emergency brake module 501, developed in its entirety according to SIL≥3 criteria.

A decision submodule 702 executes functions similar to the two-input higher-pressure selection submodule 504 or three-input higher-pressure selection submodule 606, respectively in FIG. 5 and FIG. 6.

The decision submodule 702 has the function of deciding whether the braking pressure control signal 607 coming from the three-input higher-pressure selection submodule 606 is to be achieved pneumatically by the pressure control submodule 505 and the submodule of the electro-pneumatic actuator 506 or if it is to be appropriately converted into a braking torque demand signal 703 and sent to traction systems (not shown) directly through the communication channel 536 or propagated through the service brake module 507.

The decision submodule 702 receives continuous information on the value of the braking torque signal of the motors 704 detected by a suitable torque sensor 705. The torque sensor 705, consisting, for example, but not exclusively, of transformers for measuring the currents generated by regenerating motors or by real torque transducers downstream of the motors, is developed according to SIL≥3 criteria, for example by means of redundant and mutually diagnosed channels.

In this way, the complete path between the electromotive braking torque measurement upstream of the torque sensor 705 up to the decision of the decision submodule 702 on how to manage the braking torque complies with the SIL≥3 requirements.

In the presence of the control signal of a braking pressure 607 coming from the three-input higher-pressure selection submodule 606, the decision submodule 702 transmits the equivalent torque demand to the traction system, measures the actual response thereof through the torque sensor 705, and if the resulting value is less than the required value, immediately provides for compensating the missing quantity by demanding it to the pressure control submodule 505 and the submodule of the electro-pneumatic actuator 506.

In other words, the emergency brake module 501 generates a braking torque by demanding electrodynamic braking torque, monitoring continuously the electrodynamic braking torque by means of said torque sensor 705, and compensates for a possible partial or total lack of electrodynamic braking torque through the production of pneumatic braking torque.

The illustrated solution thus guarantees the management and application of an SIL≥3-level emergency braking partially or totally through the regenerative electrodynamic braking system, independently of the fact that said regenerative electrodynamic braking system and the systems through which the submodule transmits the braking torque demand signal 703 to the traction system are developed according to SIL≤2 criteria.

Also described is a further embodiment adapted to handle emergency braking in high speed conditions.

Figure 8:
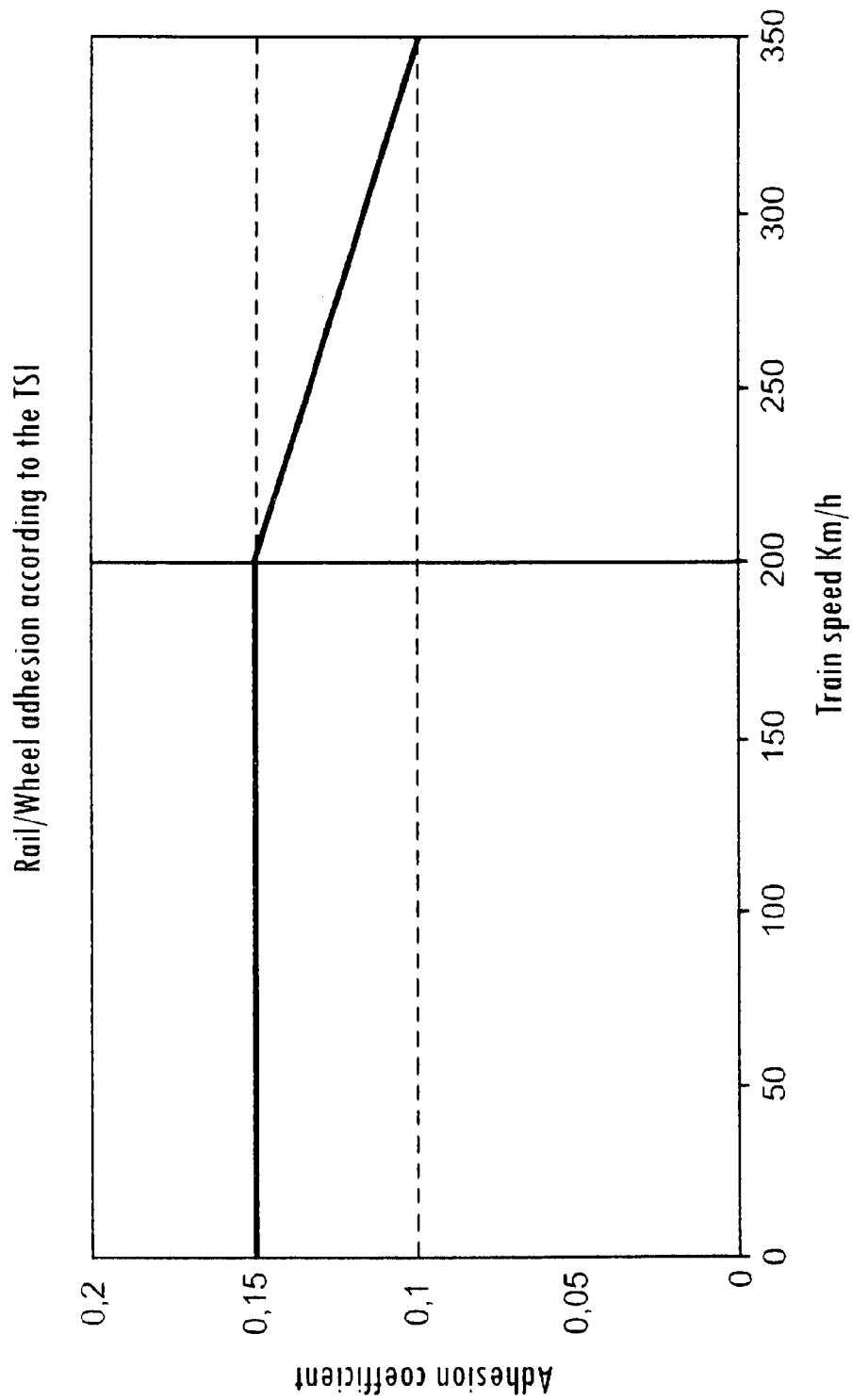
FIG. 8 shows qualitatively a curve of the level of adhesion between wheel and rail according to the adhesion coefficient and the vehicle speed.

It is known that the level of adhesion between wheel and rail undergoes a decrease at the increase of speed according to a law qualitatively indicated in FIG. 8.

A vehicle speed signal 706, acquired through a SIL≥3 channel, for example, but not exclusively, by means of speed sensing means 707 of rotation of the redundant and mutually diagnosed wheels, is acquired by the decision submodule 702, which will provide for limiting the demand for electrodynamic braking torque and/or braking pressure according to the curve in FIG. 8, previously mapped in the decision submodule 702.

In this way, the emergency brake module 501 is able to correct a braking pressure as the adhesion of the vehicle varies according to the speed of the vehicle.

A person skilled in the art is aware of the fact that the module relating to service braking, in all its possible embodiments, may be realized within the TCMS device and may communicate with the emergency brake module through the communication channel 536.

A person skilled in the art is furthermore aware that the actuation system may be of a hydraulic rather than pneumatic type.

For example, but not necessarily, the service brake module 507 is achieved within other on-board train systems.

Moreover, the emergency brake module 501 may comprise more than one group including a pressure control submodule 505 and an electro-pneumatic actuator 506 for independently controlling multiple brake cylinders, according to the characteristic architecture of the vehicle.

In the previously described embodiments, the emergency brake module 501 may be designed in accordance with the requirements of EN50128 SIL≥3 and EN50129 SIL≥3, and the service brake module 507 may be developed in accordance with the requirements EN50128 SIL 2≤ and EN50129 SIL≤2.

Several aspects and embodiments of an electronic control system of emergency and service braking for a railway vehicle according to the present invention have been described. It is understood that each embodiment may be combined with any other embodiment. The invention, moreover, is not limited to the described embodiments, but may be varied within the scope of protection as described and claimed herein.

The invention claimed is:

1. An electronic control system of a vehicle, comprising:
  a service brake module having an electronic architecture that is compliant with a first standard; and
  an emergency brake module connected in series with and communicatively coupled with the service brake module, the emergency brake module having an electronic architecture that is compliant with a second standard that is stricter than the first standard,
  the service brake module configured to receive a deceleration demand signal and a first weight signal of the vehicle, the service brake module configured to generate a service braking pressure signal based on the deceleration demand signal and the first weight signal,
  the emergency brake module configured to receive at least one signal indicative of an emergency braking demand and a second weight signal of the vehicle, the emergency brake module configured to generate an intermediate braking pressure signal based on the at least one signal indicative of the emergency braking demand and the second weight signal, the emergency brake module including a higher-pressure selection submodule configured to receive the service braking pressure signal and the intermediate braking pressure signal, the higher-pressure selection submodule configured to compare the service braking pressure signal with the intermediate braking pressure signal to determine a higher value between the service braking pressure signal and the intermediate braking pressure signal, the higher-pressure selection submodule of the emergency brake module configured to generate a braking pressure control signal based on the higher value between the service braking pressure signal and the intermediate braking pressure signal, the emergency brake module also including a pressure control submodule configured to receive the braking pressure control signal from the higher-pressure selection submodule and convert the braking pressure control signal into a braking pressure by controlling an electro-pneumatic actuator of the vehicle.

2. The electronic control system of claim 1, wherein the at least one signal indicative of the emergency braking demand is a signal indicating control pressure of a braking system of the vehicle, of which at least one extreme value is indicative of an emergency braking condition.

3. The electronic control system of claim 1, wherein the emergency braking demand is a first emergency braking demand, wherein the emergency brake module is configured to receive a second emergency braking demand from an electric emergency loop, the emergency brake module configured to generate an emergency braking signal based at least in part on the second emergency braking demand.

4. The electronic control system of claim 1, wherein the service brake module is operably coupled with one or more other control systems on board the vehicle.

5. The electronic control system of claim 1, wherein the emergency brake module is connected to a torque sensor of electrodynamic braking torque.

6. The electronic control system of claim 5, wherein the torque sensor of the electrodynamic braking torque is designed in accordance with the first set of design requirements.

7. The electronic control system of claim 5, wherein the emergency brake module is configured to generate a braking torque by initiating the electrodynamic braking torque, monitoring the electrodynamic braking torque via the torque sensor, and compensating for an amount of torque provided by production of pneumatic braking torque.

8. The electronic control system of claim 1, wherein the emergency brake module is configured to control the electro-pneumatic actuator to change the braking pressure based on a speed of movement of the vehicle.

9. The electronic control system of claim 1, wherein said communication channel is a wireless channel.

10. The electronic control system of claim 1, wherein said communication channel is made by a bus.

11. The electronic control system of claim 1, wherein said communication channel is made through one or more hard-wired solutions.

12. The electronic control system of claim 3, wherein the higher-pressure selection submodule is configured to compare the service braking pressure signal with the intermediate pressure signal and the emergency braking pressure signal to determine a highest value between the service braking pressure signal, the intermediate pressure signal, and the emergency braking pressure signal.

13. The electronic control system of claim 12, wherein the higher-pressure selection submodule is configured to generate the braking pressure control signal based on the highest value between the service braking pressure signal, the intermediate pressure signal, and the emergency braking pressure signal.

14. The electronic control system of claim 13, wherein the braking pressure control signal is based on the second weight signal of the vehicle.

15. The electronic control system of claim 7, wherein the electrodynamic braking torque and the pneumatic braking torque are configured to control braking of the vehicle.

16. A method comprising:

generating a service braking pressure signal based on a service braking signal and a weight of a vehicle with a service brake module;

generating an intermediate braking pressure signal based on a first emergency braking demand and the weight of the vehicle with an emergency brake module, the emergency brake module having an electronic architecture that is compliant with a second standard that is stricter than the first standard of the service brake module;

generating an emergency braking signal based on a second emergency braking demand;

communicating the service brake pressure signal with a higher-pressure selection submodule of the emergency brake module, the emergency brake module connected in series with the service brake module;

comparing the intermediate braking pressure signal, the service braking pressure signal, and the emergency braking signal to determine a highest value between the intermediate braking pressure signal, the service braking pressure signal, and the emergency braking signal;

generating a braking pressure control signal based on the highest value between the intermediate braking pressure signal, the service braking pressure signal, and the emergency braking signal; and converting the braking pressure control signal to a braking pressure by controlling an electro-pneumatic actuator of the vehicle.

17. An electronic control system of a braking system of a vehicle, comprising:

a service brake module comprising a first electronic architecture, the service brake module configured to receive a service braking pressure signal and a first weight signal of the vehicle; and an emergency brake module that is separate and independent from the service brake module, the emergency brake module being coupled in series with the service brake module, the emergency brake module comprising a second electronic architecture that is different than the first electronic architecture, wherein the first electronic architecture of the service brake module is compliant with a first standard and the second electronic architecture is compliant with a second standard that is stricter than the first standard, the emergency brake module configured to receive a first emergency braking demand signal and a second weight signal of the vehicle, the emergency brake module configured to generate an intermediate braking pressure signal based at least in part on the first emergency braking demand signal and the first weight signal, the emergency brake module being communicatively coupled with the service brake module, wherein the emergency brake module is configured to receive a second emergency braking demand signal, and generate an emergency braking signal based at least in part on the second emergency braking demand signal, wherein the service brake module is configured to generate a service braking pressure signal based at least in part on a service braking signal and the weight signal, the service brake module configured to communicate the service braking pressure signal with the emergency brake module, wherein the emergency brake module is configured to compare the service braking pressure signal, the intermediate braking pressure signal, and the emergency braking demand signal to determine a highest value between the service braking pressure signal, the intermediate braking pressure signal, and the emergency braking demand signal, the emergency brake module configured to generate a braking pressure control signal based on the highest value between the service braking pressure signal, the intermediate braking pressure signal, and the emergency braking demand signal, and wherein the emergency brake module is configured to control an electro-pneumatic actuator of the vehicle based on the braking pressure control signal.

* * * * *